United States Patent
Welin et al.

(10) Patent No.: US 10,135,741 B2
(45) Date of Patent: Nov. 20, 2018

(54) DISTRIBUTION OF SYNCHRONIZATION PACKETS OVER WIFI TRANSPORT LINKS

(71) Applicant: TELEFONAKTIEBOLAGET L M ERICSSON (PUBL), Stockholm (SE)

(72) Inventors: Annikki Welin, Solna (SE); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 222 days.

(21) Appl. No.: 14/439,256

(22) PCT Filed: Oct. 31, 2012

(86) PCT No.: PCT/SE2012/051189
§ 371 (c)(1),
(2) Date: Apr. 29, 2015

(87) PCT Pub. No.: WO2014/070056
PCT Pub. Date: May 8, 2014

(65) Prior Publication Data
US 2015/0295836 A1   Oct. 15, 2015

(51) Int. Cl.
*H04L 12/851* (2013.01)
*H04W 56/00* (2009.01)
*H04B 7/0452* (2017.01)

(52) U.S. Cl.
CPC ........... *H04L 47/24* (2013.01); *H04B 7/0452* (2013.01); *H04W 56/00* (2013.01); *H04W 56/001* (2013.01)

(58) Field of Classification Search
CPC ..... H04L 47/24; H04L 7/0013; H04L 1/0002; H04L 43/0894; H04L 47/25;
(Continued)

(56) References Cited

U.S. PATENT DOCUMENTS

2004/0114546 A1* 6/2004 Seshadri ............. H04L 29/06
                                                         370/310.2
2007/0177574 A1   8/2007 Park
(Continued)

FOREIGN PATENT DOCUMENTS

EP   2458757 A1   5/2012
JP   H08265322 A  10/1996
(Continued)

OTHER PUBLICATIONS

Lee B-H, et al., "A Safe Multiple Access-Rates Transmission (SMART) Scheme for IEEE 802.11 Wireless Networks," IEICE Transactions on Communications, Communications Society, Tokyo, JP, vol. E87-B, No. 1, Jan. 1, 2004, XP001541232; pp. 46-55.
(Continued)

Primary Examiner — Kibrom T Hailu
(74) Attorney, Agent, or Firm — Baker Botts, LLP

(57) ABSTRACT

This disclosure provides methods and an access point node for ensuring proper and correct packet based synchronization in data communications systems and networks at distribution of synchronization packets from one Access Point over a WIFI transport link to another Access Point. The access point node provides dynamic transmission rate adaption with different coding and modulation schemes. The access point node comprises an identifier unit to identify each received synchronization packet, and further comprises a controller configured to set the transmission rate for said synchronization packet according to a predetermined synchronization packet transmission rule.

28 Claims, 7 Drawing Sheets

(58) Field of Classification Search
CPC .. H04B 7/0452; H04W 56/00; H04W 56/001; H04W 52/26; H04J 3/0638
See application file for complete search history.

(56) References Cited

U.S. PATENT DOCUMENTS

| | | | | |
|---|---|---|---|---|
| 2007/0183529 | A1* | 8/2007 | Tujkovic | H04B 7/0413 375/267 |
| 2008/0037567 | A1* | 2/2008 | Cho | H04L 12/4625 370/401 |
| 2008/0273521 | A1* | 11/2008 | Shao | H04W 56/0015 370/350 |
| 2009/0190613 | A1* | 7/2009 | Finn | H04J 3/0697 370/509 |
| 2010/0121971 | A1* | 5/2010 | Shao | H04N 1/00 709/231 |
| 2010/0260083 | A1 | 10/2010 | Liao | |
| 2013/0039212 | A1* | 2/2013 | Li | H04W 52/0245 370/253 |
| 2013/0122917 | A1* | 5/2013 | Yavuz | H04J 3/0638 455/450 |

FOREIGN PATENT DOCUMENTS

| | | |
|---|---|---|
| JP | 2004112780 A | 4/2004 |
| JP | 2007166037 A | 6/2007 |
| JP | 2010118841 A | 5/2010 |
| JP | 2011514705 A | 5/2011 |
| WO | 9617452 A1 | 6/1996 |
| WO | 2010029249 A1 | 3/2010 |
| WO | 2012086372 A | 6/2012 |

OTHER PUBLICATIONS

IEEE Standard for a Precision Clock Synchronization Protocol for Networked Measurement and Control Systems, IEEE Instrumentation and Measurement Society, IEEE Std 1588-2008, IEEE, 3 Park Avenue, New York, NY; Jul. 24, 2008.

* cited by examiner

DISTRIBUTION OF SYNCHRONIZATION PACKETS OVER WIFI TRANSPORT LINKS

TECHNICAL FIELD

This disclosure relates to methods and arrangements for distributing packet based synchronization over WIFI transport links in data communication systems.

BACKGROUND

In a telecommunication systems and networks, transport links are interfaces between different nodes, both within the systems and networks and to other systems and networks. Said nodes may comprise different functionality entities such as Radio Base Stations, aggregation means, switching and/or routing means, e.g. as IP routers, etc., gateways, and servers. The transport links provide (Wireline) Bearer Services, which involve carrying data packets with payload. There is also a growing interest for using WIFI (technology in transport links, e.g. in back-haul systems and networks. As the multimedia applications such as Voice over IP (VoIP) and Audio/Visual (AV) streaming across the Internet emerge, IEEE 802.11 Wireless Local Area Network (WLAN) has become a prevailing broadband wireless technology of interest. Today, the IEEE 802.11 is considered a Wireless Ethernet by virtue of its best effort service provisioning based on Ethernet-like Medium Access Control (MAC) protocol. For supporting QoS in IEEE 802.11, a QoS-enabled MAC denoted IEEE 802.11e has been launched.

WIFI is a well-known technology used in the air interface between an Access Point (AP) and User Equipments (UEs). The APs and UEs operate in the un-licensed 2.4 GHz band, it has been suggested that WIFI technology transport link in a network and system supporting the RBS should operate in an un-licensed frequency band, e.g. 5 GHz. However, the use of un-licensed frequency bands raises noise disturbance problems from other users in the same frequency band by causing unpredictable interference. Since WIFI technology is not designed to support transport technology, it does not give good characteristics for distribution of packet based synchronization as the protocol standard IEEE 1588v2 PTP (Precision Time Protocol) for Ethernet and IP as well as high-precision NTP (Network Time Protocol) for IP. It is quite obvious that high amount of packet loss and delay variation in a synchronization packet stream cause performance problems in a system and network comprising different nodes and node entities, e.g. small base stations, macro base stations, require reliable and accurate coordination regarding phase synchronization and frequency synchronization.

SUMMARY

The problem to be solved is to minimize the influence of different disturbing elements which influences lead to improper operation of packet based synchronization in data communications systems and networks having one or more interface using WIFI technology.

One object is therefore to provide a way of ensuring proper and correct packet based synchronization in data communications systems and networks when distributing synchronization packets over WIFI transport links.

According to one aspect, a method and embodiments of the method for achieving said object are provided. Said method and embodiments thereof ensure proper and correct packet based synchronization in data communications systems and networks when distributing synchronization packets from one Access Point over a WIFI transport link to another Access Point. An arrangement in the Access Point provides dynamic transmission rate adaption with different coding and modulation schemes. The method identifies each received synchronization packet and sets the transmission rate for said synchronization packet according to a predetermined synchronization packet transmission rule.

Further embodiments of the method are provided in the dependent claims.

According to further one aspect, an arrangement and embodiments of the arrangement for achieving said object are provided. The arrangement and embodiments thereof is in an Access Point node. The arrangement ensures proper and correct packet based synchronization in data communications systems and networks when distributing synchronization packets from one Access Point over a WIFI transport link to another Access Point. The arrangement Access Point provides dynamic transmission rate adaption with different coding and modulation schemes. Said arrangement comprises an identifier to identify each received synchronization packet, and a controller is configured to set the transmission rate for said synchronization packet according to a predetermined synchronization packet transmission rule.

Further embodiments of the arrangement are provided in the dependent claims.

One advantage is that WiFi becomes more reliable for distribution of packet based synchronization over the air interface regardless of synchronization implementation, e.g. time stamping of the synchronization packet in the WiFi node, and synchronization of transparent, boundary or pass-through clocks.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

The present examples of embodiments refer to data traffic performance when using WIFI technology as a bearer in a transport link interface between two nodes in a system and network.

The present examples of embodiments refer to data traffic performance when using WIFI technology as a bearer in a transport link interface between two nodes in a system and network.

Figure 1:
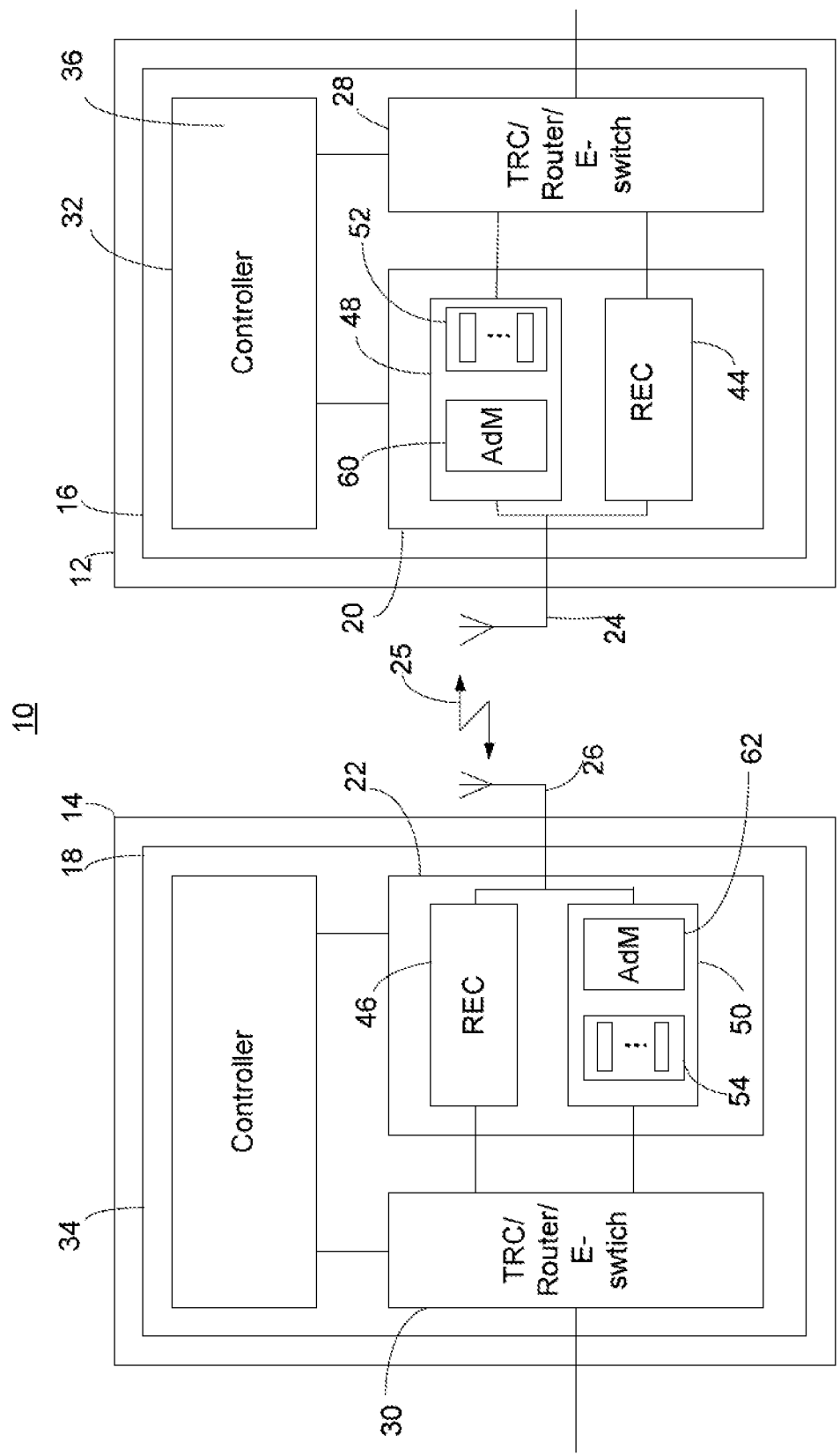
FIG. 1 is a block diagram of an exemplary network and system in which arrangement and methods described herein may be implemented.

FIG. 1 illustrates schematically an overview of a part of a system and network 10. As understood by a skilled person, a system and network for supporting service traffic comprises many more functional blocks and entities, but details and features that are of none or less interest for the understanding of the following description of the present examples and embodiments have been left out for not obscuring the description of the present invention with unnecessary details. Thus, FIG. 1 illustrates a part of specific interest in which exemplary entities and methods described herein may be implemented.

FIG. 1 illustrates an example of an embodiment of a transport link 25 between two nodes 12, 14 of a part of a system and network 10 for supporting data traffic. In the following example of an embodiment, the nodes are Access Points, APs, in a data communications system. Each node comprises a node arrangement 16, 18. The transport link 25 is a wireless link using WIFI as bearer technology in both directions. Thus, both APs comprises at least one WIFI transceiver 20, 22 connected to one or more antennas 24, 26 for receiving and transmitting radio traffic via the transport link 25 over the air interface between the APs. In this example, each AP also comprises a second transceiver 28, 30 for receiving and transmitting data traffic over links to other nodes of the same or other data communications networks. Said second transceiver may also be a router (in IP) or an Ethernet Switch. Said links may also be wireless and/or wired connections. Thus, the link 25 between the two APs may constitute a part of a data path between different sources and receivers of data traffic.

In this example, said data traffic comprises sent IP or Ethernet frames of data packets, all involving data headers and payload of data packets. However, data packets being configured according to other standards and protocols are possible.

Each AP also comprises a controller 32, 34, which may be implemented in a processing device as software or computer program product tangibly embodied in a machine readable storage device for execution by the processing device. Said processing device may be a programmable data processor, microprocessor, etc. Said controller may be configured as a number of interconnected sub-controllers, which are distributed to a number of functional entities within an AP. In such an example, each transceiver 20, 22 may comprise an own controller. The controller 32, 34 is configured to control the transceivers, which handles the incoming data frames and data packets by means of the transceivers, and to handle data frames and data packets to be sent by said transceivers 20, 22. The controller 32, 34 is therefore equipped with different functionalities, which are implemented in computer executable software to be executed by the controller. Functionalities of none or less interest for the understanding of the following description of the present examples and embodiments have been left out for not obscuring the description of the present invention with unnecessary details. Therefore, only the functionalities of special interest is described herein.

The WIFI transceiver 20, 22 in the node arrangement of the AP comprises one or more WIFI transmitters 48, 50 and WIFI receivers 44, 46. The transmitters comprises a number of different priority queues buffers 52, 54 for temporary buffering the data packets and frames before and transmission rate adaptive modulators, AdM, 60, 62 for modulating and coding the packets or frames before transmission over the air interface.

Rate adaptation is used for optimizing the transmission capacity over link layer. The IEEE 802.11n standard specifies multiple transmission rates at the physical layer that use different modulation and coding schemes. To exploit such multi-rate capability, a sender must select the best transmission rate and dynamically adapt its decision to the time-varying and location dependent channel-quality, without explicit information feedback from the receiver. Such an operation is known as rate adaptation. The basic idea is to estimate the channel quality and adjust the transmission rate accordingly.

Various modulation schemes and coding rates are defined by the standard 802.11n and are represented by a Modulation and Coding Scheme (MCS) index value. In the end of this Detailed Description, one table 2 shows the relationships between the variables that allow for the maximum data rate for the Modulation and Coding Schemes.

The transmitters transmit each data packet or frame towards an addressed AP over the air interface. Such a transmitter may be configured to transmit data packets or frames in/on one channel or in/on a plurality of channels according to Multiple-In-Multiple-Out (MIMO) technology, e.g 2×2, 4×4, 8×8 MIMO and variants thereof, e.g. SIMO, MISO. 2×2 MIMO means 2 channels out and 2 channels in, i.e. 2 channels are used for transmitting and 2 channels are used for receiving data over the air.

The WIFI transmitters are configured to send each data packet and/or frame according to a specific WIFI standard data link layer protocol supporting a Quality of Service mechanism.

From an overall network service perspective, Quality of Service (QoS) should provide end-to-end traffic control so that users' application can be properly served according to the allowable quality requirements such as delay, jitters and packet loss rate. To comply with the service quality requirements, user level traffic of the applications should coordinate QoS traffic control with transport level QoS at the network interfaces.

Quality-of-Service (QoS) in an end-to-end architecture may be based on different standards, e.g. such as Differentiated Service (DiffServ) across a wired WAN or IEEE 802.1D/Q across a wired LAN or Ethernet LAN. The air interface between two nodes is defined by IEEE 802.11e standard. Under the prioritized QoS paradigm, said standard provides differentiated channel access to traffic with 4 different priority levels. Thus, the node arrangement in an AP may have to support mapping of the different QoS between standards.

An IP frame carries a QoS value as a Differentiated Service CodePoint (DSCP) value in its Differentiated Service (DS) field. In IEEE 802.1D/Q, QoS is classified in different Traffic Type classes and carried in the User Priority field or the Class-of-Service (CoS) field. In the context of 802.11e MAC, i.e. Medium Access Control, a corresponding priority value is defined. Said priority value is called Traffic Category Identification, TCI or TCID. Each frame arriving at a MAC with priority is mapped into one of four different levels of priorities denoted Access Category (AC) classes.

In table 1, it is illustrated how said different TCID values and AC can be mapped according to Traffic Types and DSCP values.

TABLE 1

Mapping of Access Classes and TCI values against Ethernet CoS and IP QoS.

| 802.11e Traffic Category Identification (TCI), 802.1D/Q P-bit | 802.11e Access Category (4 classes) | 802.1D/Q Traffic Type (Ethernet standard definition) | Traffic Type (IP standard definition) | DSCP (IP frame QoS value) |
|---|---|---|---|---|
| 1 | Background | Background | Background | 10 (AF11) |
| 2 | Background | Spare | Background | 18 (AF21) |
| 0 | Best Effort | Best Effort | Best Effort | 0 (BE) |
| 3 | Best Effort | Excellent Effort | Voice Control | 26 (AF31) |
| 4 | Video | Controlled Load | Video | 34 (AF41) |
| 5 | Video | Video | Voice | 46 (EF) |
| 6 | Voice | Voice | Inter-Network Control | 48 |
| 7 | Voice | Network Control | Network Control | |

In an AP supporting IEEE 802.11e, each Access Category corresponds to a special MAC queue. The controller in the node arrangement in an AP has a Medium Access Control (MAC) functionality which enables received data traffic to be transmitted according to their priority. i.e. AC class. Thus, high priority data packets and frames are queued in a high priority queue buffer and have faster channel access than corresponding low priority traffic in low priority queues.

One data packet category of special interest in this disclosure is the traffic of synchronization packets over a WIFI link. Said synchronization packets are used for clock synchronization, e.g. in Radio Base Stations of different kind. Heterogeneous network deployments of small base stations lack coordination between small base stations or between small base stations and macros base stations. Large scale build out of small base stations will also require coordination between both small and macro base stations, and this requires distribution of good frequency and phase synchronization to the small base stations as well. A common request is to be able to use the WiFi technology as transport or bearer of data packet traffic for the small RBSs.

To keep the cost for deployment of small base stations low network operators requires higher flexibility on back-haul technologies that must be possible to use as transport for the small base station.

The WiFi technology has also evolved to be able to use the capacity in the frequency band in an optimal way by using adaptive modulation.

All this together can cause high amount of delay variation and possible loss for packets, all depending on how the modulation changes, and how much interference and possible retransmission is required on the WiFi link.

There are challenges for packet based synchronization to work in a correct way are to minimize the delay variation, link asymmetry (different delay in different directions) and packet loss for the synch packets.

The problem to be solved is to minimize the influence of different disturbing elements which influences lead to improper operation of packet based synchronization in data communications systems and networks having one or more interface using WIFI technology.

One object is therefore to provide a way of ensuring proper and correct packet based synchronization in data communications systems and networks when distributing synchronization packets over WIFI transport links. The exemplified node arrangement in FIG. 1 has therefore to be configured to ensure proper and correct packet based synchronization in data communications systems and networks when distributing synchronization packets over a WIFI transport link.

Figure 2:
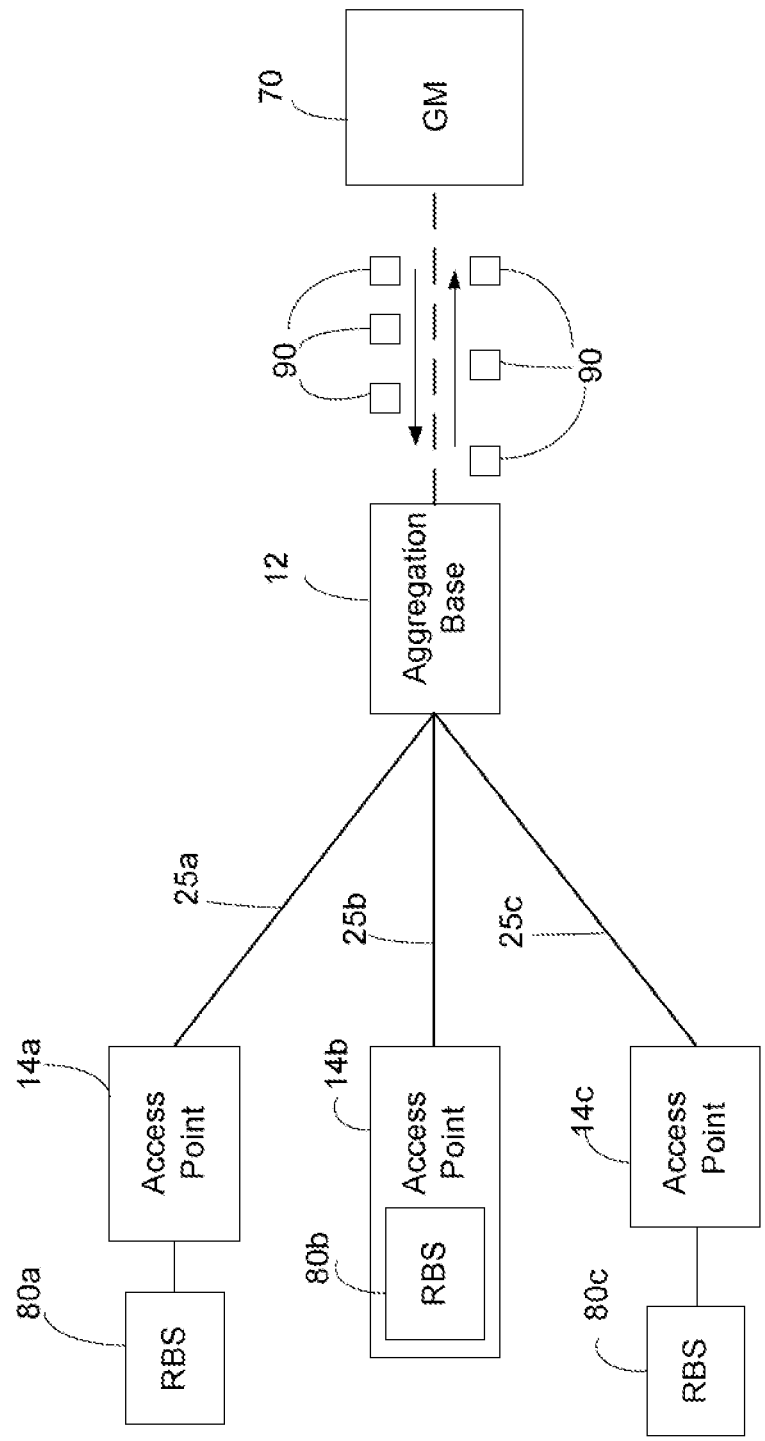
FIG. 2 is a block diagram illustrating the distribution of synchronization packets in a network.

FIG. 2 illustrates schematically an overview of an example of a part of a system and network for supporting data traffic to and from end users and their User Equipments, UEs. As understood by a skilled person, a system and network for supporting service traffic comprises many more functional blocks and entities, but details and features that are of none or less interest for the understanding of the following description of the present examples and embodiments have been left out for not obscuring the description of the present invention with unnecessary details.

Thus, FIG. 2 illustrates a part of specific interest in which exemplary entities and methods described herein may be implemented. FIG. 2 is intended to illustrate the meaning of proper and correct packet based synchronization in data communications systems and networks when distributing synchronization packets from one Access Point over a WIFI transport link to one or more other Access Points.

Thus, the above described and illustrated example of a WIFI transport link between two nodes is in the following example a part of the system and network via Radio Base Stations, which may be connected to the APs being able to receive and transmit the data traffic via an WIFI transport link between said AP and another AP as described above, with reference to FIG. 1.

According to the illustrated example, the system and network comprises a Grand Master, GM 70, in a node, which GM is provided with a grand master clock (not shown) for providing a stream of synchronization packets 90 intended for, among other things, synchronization of Radio Base Stations for wireless telecommunications. The synchronization packets are sent with a predetermined interval between them, which could be measured. Said synchronization packets will be differently delayed along the path and the packets are also time stamped in different nodes along the way. The synchronization packets provide the possibility to correction of different clocks along the way. An aggregation base 12 is configured to distribute the stream of received synchronization packets over WIFI transport links 25a, 25b, 26c to the Access Points (AP) 14a, 14b, 14c, respectively. The AP connects to one Radio Base Station, RBS, 80a, 80b, 80c. Said base stations are operating according to any access standard, e.g. 3GPP (3rd Generation Partnership Project), LTE (Long Term Evolution), GSM (Global System for Mobile Communications), etc, of which some require synchronization of base stations within an area and/or linked to the same operator. Examples of access technologies for wireless telecommunications requiring base station synchronization is e.g. 3GPP. By means of the stream of synchronization packets 90, the RBSs having a clock are able to synchronize said clocks. Further, the RBSs will return the received synchronization packets, which will return on the same path as they arrive. The GM 70 is therefore able to measure the Round Trip Time (RTT).

The synchronization packets are in the following example configured to transport information according to the IEEE 1588 PTP (Precision Time Protocol) or high-precision NTP (Network Time Protocol). Said synchronization packets are transported and embedded in either an IP frame or Ethernet frame.

For packet based synchronization to work in a correct way, the issue is to minimize the delay variation, link asymmetry (different delay in different directions) and packet loss for the synch packets. As the WiFi technology has also evolved to be able to use the capacity in the frequency band in an optimal way by using adaptive modulation and coding. Non-published experiments and tests have shown that high amount of delay variation of the synchronization packets and possible loss for packets depends on the modulation changes due to the use of adaptive modulation and coding on the WiFi link. Further, it has also been shown by these tests that the use of higher modulation and coding schemes for achieving higher transmission rates causes unreliable and unstable packet based synchronization. The relationship between higher modulation and coding schemes, higher MCS index, and higher transmission rates, data rates, is clear in table 2 in the end of this Detailed Description section. The selection of low transmission rate, or data rate, is favourable to minimize these problem. It is therefore suggested herein that by forcing the adaptive modulator to set a low transmission rate, e.g. MCS index 0 prescribing Binary Phase Shift Keying, BPSK, modulation (see table 2), even though the dynamic link rate algorithm would allow higher transmission rates, the packet based synchronization become more stable and reliable.

Figure 3:
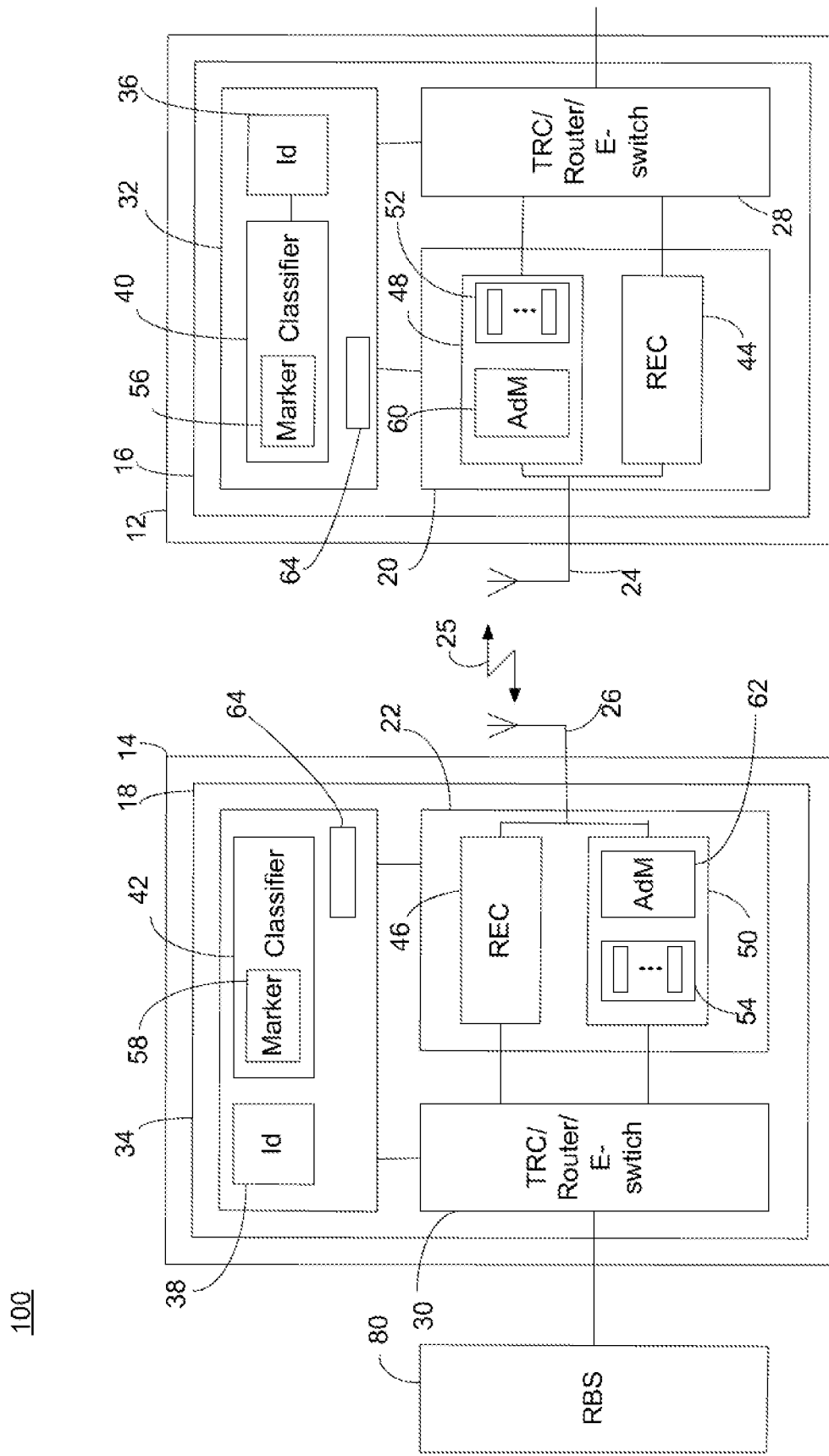
FIG. 3 is a block diagram illustrating an embodiment of an arrangement.

In FIG. 3, an example of an embodiment of an arrangement 16 for supporting the above described methods are illustrated. Said arrangement is provided in the Access Point nodes 12, 14. Said arrangement ensures proper and correct packet based synchronization in data communications systems and networks 100 when distributing synchronization packets from one Access Point 12 over a WIFI transport link 25 to another Access Point 14, and vice versa, i.e. in both directions.

The arrangement 16 is descried in more detail. The design of the arrangement 18 in node 14 is similar. Further, not all elements and components of the arrangement will be described herein, as they have been already described for the arrangements illustrated in FIG. 1. Therefore, the same reference numbers are used for the same elements and components being similar in the two FIGS. 1 and 2.

The arrangement provides dynamic transmission rate adaption with different coding and modulation schemes by means of a controller 32 and modulator 60.

The controller 32 comprises a data packet and/or data frame Identifier functionality. Said Identifier, Id, 36, which is illustrated as a block in the controller block, is configured to determine by means of the headers of the data packets or frames which kind of data packet or data frame that is received. Said Identifier 36 is associated with the controller functionality, and the identifier may be implemented in computer software to be executed by the controller 32.

Each controller also comprises a data packet and/or data frame classifier functionality. Said Classifier 40 which is illustrated as a block in the controller block, is configured to classify each data packet and/or frame according to one or more requirements or rules, e.g. regarding low modulation and coding scheme which here is similar to a low MCS index (see table 2 in the end of this Detailed Description section), Quality-of-Service, etc. Said classifier 40 comprises marker 56 functionalities for marking frame headers according to the set classification.

Thus, said arrangement comprises an identifier 36 being capable of identifying each received synchronization packet. Further, the controller 32 is configured to set the transmission rate for said synchronization packet according to a predetermined synchronization packet transmission rule that either may be stored in a memory storage communicating with the controller 32 or in the controller itself.

Said predetermined synchronization packet transmission rule 64 may require that the transmission of the synchronization packets with the same transmission rate in both directions over the transport link between two Access Points. In further one embodiment of the arrangement, the predetermined synchronization packet transmission rule 64 also requires that the transmission of the synchronization packets with the transmission rate offering the low transmission capacity and/or bandwidth of the available transmission rates, i.e. MCS index 0 prescribing Binary Phase Shift Keying, BPSK, modulation (see table 2), even though the dynamic link rate algorithm would allow higher transmission rates, the packet based synchronization become more stable and reliable.

In further one example of an embodiment, the predetermined synchronization packet transmission rule also requires that the transmission of the synchronization packets with the available transmission rate offering high immunity for the synchronization packets, i.e. MCS index 0 prescribing Binary Phase Shift Keying, BPSK, modulation (see table 2), even though the dynamic link rate algorithm would allow higher transmission rates, the packet based synchronization become more stable and reliable.

In another example, the predetermined synchronization packet transmission rule 64 also may require that the transmission of the synchronization packets according to the same channel access priority in both directions over the transport link between two Access Points, said channel access priority being defined by transmission with none or shortest available delay.

The controller 32, which is configured for setting the transmission rate for the adaptive modulator 60, further comprises a classifier 40, which is configured to classify each synchronization packet to a channel access priority class is specified by its none or shortest available delay characteristics. Said delay requirements are set in, e.g. the standard IEEE 802.11e for Enhanced distributed channel access (EDCA). With EDCA, high-priority traffic has faster channel access than low-priority traffic: an AP with high priority traffic waits a little less before it sends its packet, on average, than an AP with low priority traffic. This is accomplished by using a shorter contention window (CW) and shorter arbitration inter-frame space (AIFS) for higher priority packets. The exact values depend on the physical layer that is used to transmit the data. In addition, EDCA provides contention-free access to the channel for a period called a Transmit Opportunity (TXOP). A TXOP is a bounded time interval during which an AP can send as many frames as possible (as long as the duration of the transmissions does not extend beyond the maximum duration of the TXOP). If a frame is too large to be transmitted in a single TXOP, it should be fragmented into smaller frames.

The levels of priority in EDCA are called access categories (ACs). The CWmin and CWmax values are calculated from aCWmin and aCWmax values, respectively, that are defined for each physical layer supported by 802.11e.

Calculation of contention window boundaries is
AC CWmin CWmax
Background (AC_BK) aCWmin aCWmax
Best Effort (AC_BE) aCWmin aCWmax Video (AC_VI) (aCWmin+1)/2−1 aCWmin
Voice (AC_VO) (aCWmin+1)/4−1 (aCWmin+1)/2−1

Thus the AC class "voice" provides the shortest channel access delays and is therefore preferred as a channel access priority class.

The controller 32 may be configured to direct and forward each synchronization packet to a buffer in the WIFI transceiver, said buffer 52 comprising one or more buffer queues 52 for data packets and frames being classified in said channel access priority class providing none or shortest available delay.

The controller 32 in the arrangement therefore has a Medium Access Control (MAC) functionality which enables received data traffic to be transmitted according to their priority. i.e. AC class. In an AP supporting IEEE 802.11e, each Access Category corresponds to a special MAC queue. Thus, high priority data packets and frames are queued in a high priority queue buffer and have faster channel access than corresponding low priority traffic in low priority queues.

In one embodiment, said one or more buffer queues 52 are only provided for data packets and frames being classified in said channel access priority class providing none or shortest available delay and to be transmitted according to one single transmission rate set by the predetermined synchronization packet transmission rule.

In further one embodiment, a buffer queue 52 is provided for synchronization packets only.

The arrangement comprises a transceiver 20, which is capable of transmitting each synchronization packet towards an addressed Access Point 14 over the transport link in the air interface according to the predetermined synchronization packet transmission rule. Said transceiver 20 is configured to transmit each synchronization packet by means of MIMO technology or variants of the MIMO technology, e.g. SIMO (Single-Input-Multiple-Output), MISO (Multiple-Otput-Single-Output). Said technologies are well-known in the art and will therefore not be described herein in more details. By using these technologies, the transceiver 20 may be configured to transmit each synchronization packet simultaneous and in parallel over more than one channel of said transport link. By using coherent or differential space-time block codes or other similar techniques across multiple antennas, the reliability of the transfer of synchronization packets and the packet based synchronization are improved.

In the described example, the Access Points 14 comprises or is connected to a Radio Base Station 80. As illustrated FIG. 2, one of the Access Points may be an aggregation base in a telecommunications system and network. Said aggregation base corresponds to Access Point 12. Thus, the Access Point 12 may serve a number of WIFI transport links 25 to different Access Points, each of said Access Points being connected to and/or housing a Radio Base Station, RBS, for providing radio access to different User Equipments, UEs, such as smart phones, mobile phones, laptops or other mobile devices comprising telecommunication equipment. By means of the embodiments described herein, reliable transfer of data and radio signals due to the distribution of packet based synchronization has been provided.

Figure 4:
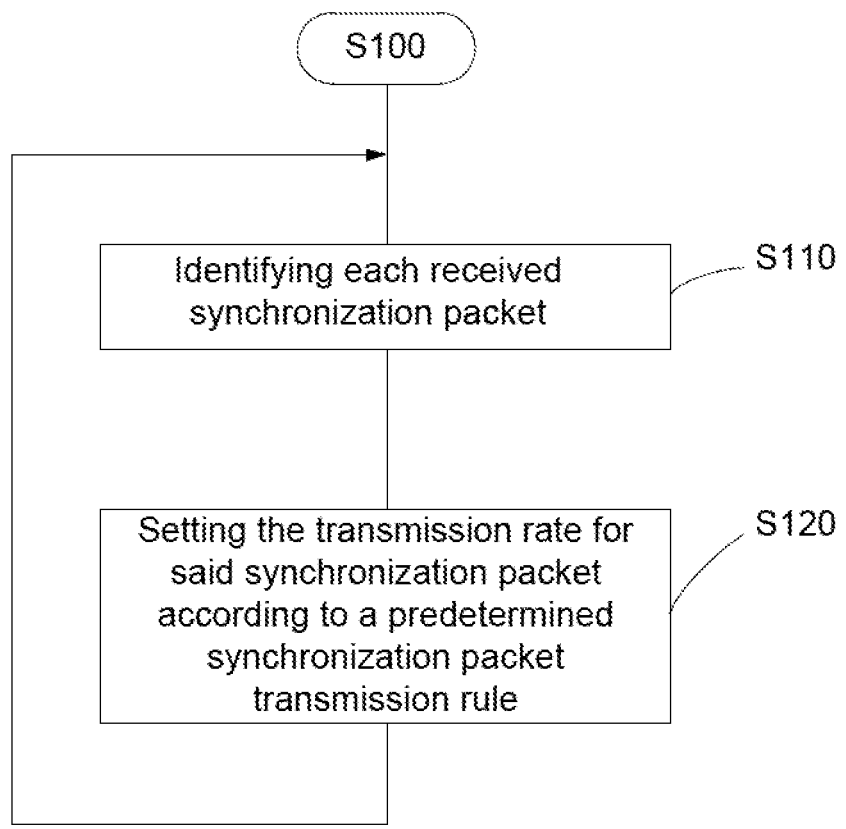
FIG. 4 is flowchart illustrating an embodiment of a method.

FIG. 4 is a flowchart illustrating an example of an embodiment of a method for ensuring proper and correct packet based synchronization in data communications systems and networks when distributing synchronization packets over a WIFI transport link. Said method S100 may be implemented in a network and system as described above with reference to FIG. 3, which network and system comprising a WIFI transport link between two nodes. For ensuring proper and correct packet based synchronization, said method comprises:

S110: Identifying each received synchronization packet. As already described above, the second transceiver (28 in FIG. 3) in the AP receives data packets and data frames. Each data packet or frame has a header in which information regarding the data packet is involved. Said information is structured according to a standard protocol. A synchronization packet is received encapsulated in an IP frame or Ethernet frame. The identifier (36 in FIG. 3) functionality in the controller (32 in FIG. 3) reads the header information and the identifier is able to identify an encapsulated synchronization packet, whereby the controller is trigged to handle the frame (Ethernet or IP) synchronization packet according a certain process for handling synchronization packets, which will be described in the following steps of the process.

S120: Setting the transmission rate for said synchronization packet according to a predetermined synchronization packet transmission rule. The controller (32 in FIG. 3) is configured to set the transmission rate for said synchronization packet according to a predetermined synchronization packet transmission rule. Thus, the dynamic adaptive coding and modulation is overruled by a predetermined synchronization packet transmission rule. The predetermined synchronization packet transmission rule requires transmission of the synchronization packets with the same transmission rate in both directions over the transport link between two Access Points. Further, the said rule may require transmission of the synchronization packets with the transmission rate offering low transmission capacity and/or bandwidth of the available transmission rates. The predetermined synchronization packet transmission rule may also require transmission of the synchronization packets with the available transmission rate offering high immunity for the synchronization packets. In addition, the predetermined synchronization packet transmission rule may require transmission of the synchronization packets according to the same channel access priority in both directions over the transport link between two Access Points, said channel access priority being defined by transmission with none or shortest available delay. High immunity is techniques offering protection against disturbance like low order modulation or forward error correction techniques.

Figure 5:
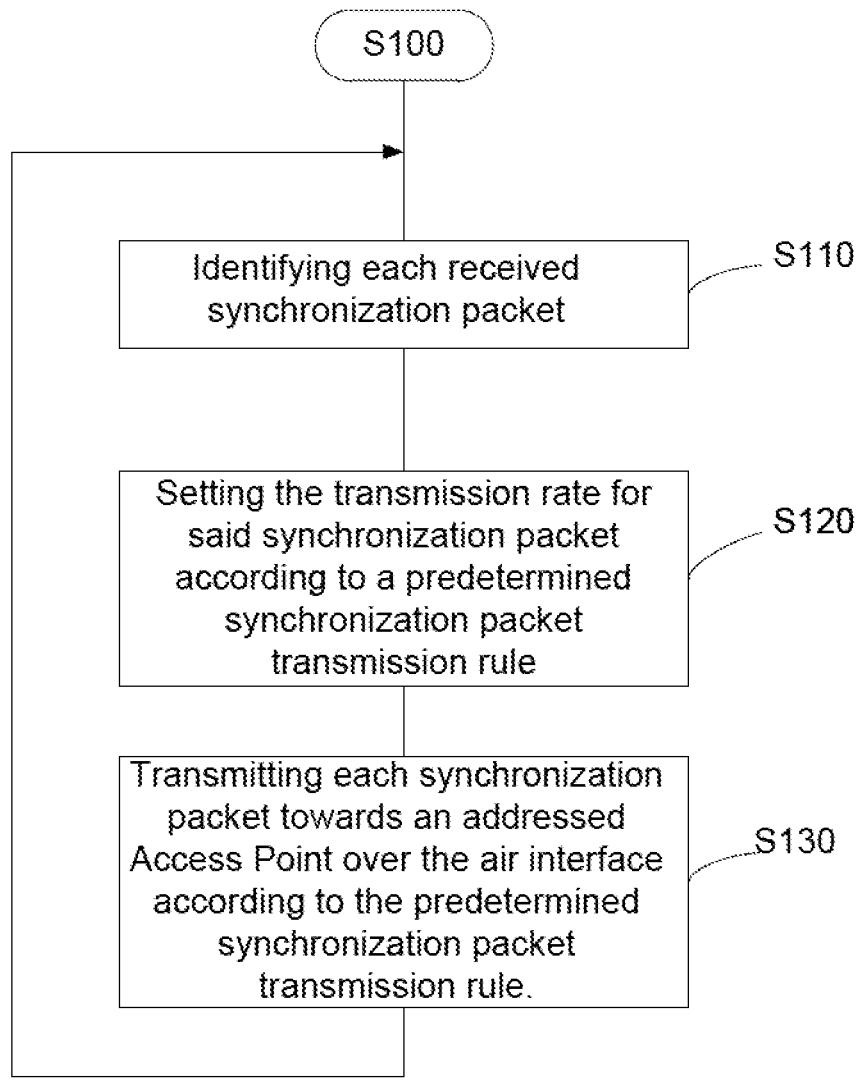
FIG. 5 is a flowchart illustrating further one embodiment of the method in FIG. 4.

FIG. 5 is a flowchart illustrating an embodiment of the method comprising S110, S120, and S130, wherein S130 comprises S130: Transmitting each synchronization packet towards an addressed Access Point over the air interface according to the predetermined synchronization packet transmission rule. Said transmission may be performed over one single channel, but each synchronization packet may be transmitted simultaneous and in parallel over more than one channel of said transport link by means of MIMO technology or variants of the MIMO technology.

Figure 6:
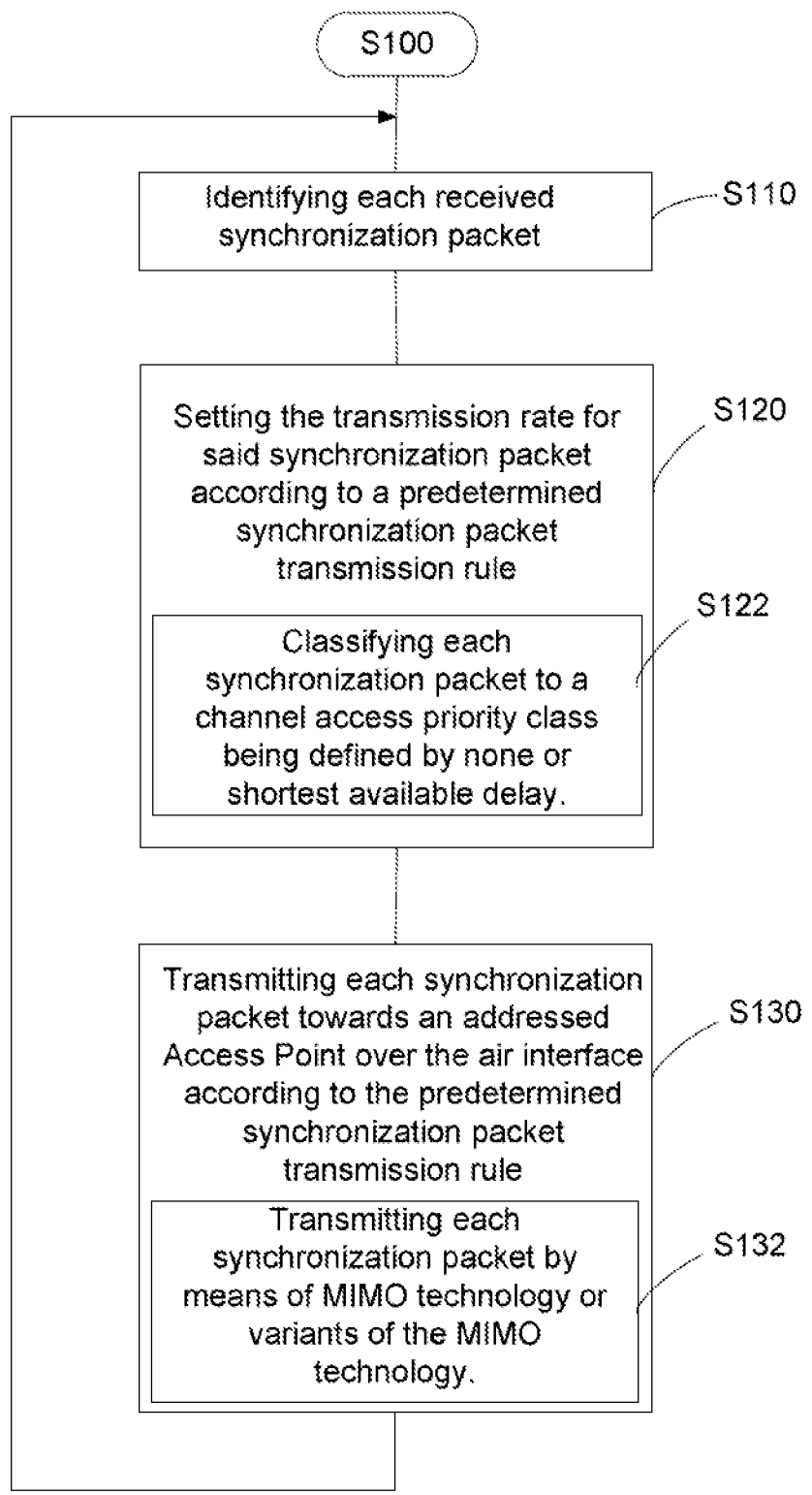
FIG. 6 is a flowchart illustrating further one embodiment of the method in FIG. 4.

According to further one embodiment of the present method, as illustrated in FIG. 6, S130 may involve:

S132: Transmitting each synchronization packet by means of MIMO technology or variants of the MIMO technology. The transmission of each synchronization packet may be performed simultaneous and in parallel over more than one channel of said transport link comprises the use of coherent or differential space-time block codes or other similar techniques across multiple antennas. The reliability of the radio signal and synchronization packet can be further enhanced by also associating the "sync queue" to use coherent or differential space-time block codes or other similar techniques across multiple antennas to improve the reliability of the transfer of synchronization packets.

As illustrated in FIG. 6, the same embodiment of the present method, S120 may involve:

S122: Classifying each synchronization packet to a channel access priority class being defined by none or shortest available delay.

Figure 7:
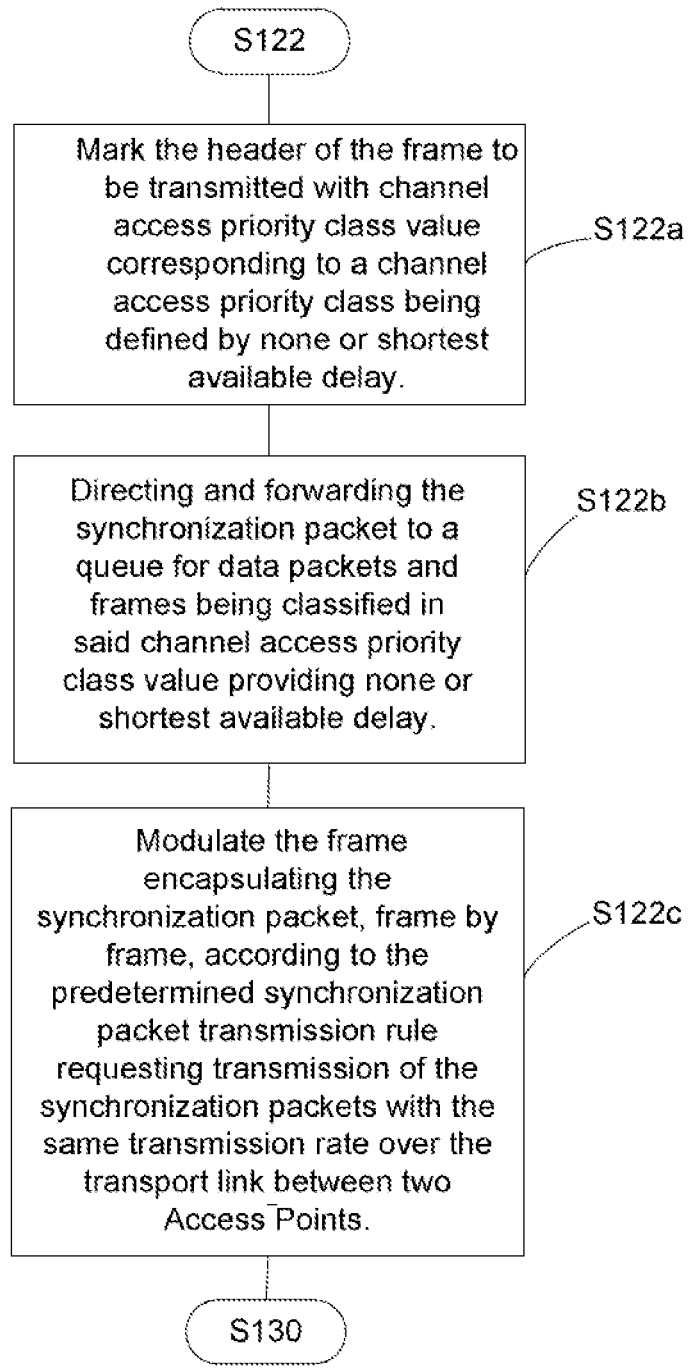
FIG. 7 is a flowchart illustrating a sub-process of the method in FIG. 4.

S122 may be described by a number of sub-steps S122a, S122b and S122c, which is illustrated in the flowchart in FIG. 7:

S122a: Mark the header of the frame to be transmitted with channel access priority class value corresponding to a channel access priority class being defined by none or shortest available delay. In the example wherein the IEEE 802.11e standard frame is used, the classifier (see 40 in FIG. 3) functionality of the controller is configured to mark in the header of the frame with the Traffic Category Identification (TCI or TCID) value to the corresponding IEEE 802.11e Access Class (AC) class which corresponds to a channel access priority class being defined by none or shortest available delay. In table 1, said AC class is defined as "Voice" and having the TCI value "6" or "7".

S122b: Directing and forwarding the synchronization packet to a queue for data packets and frames being classified in said channel access priority class value providing none or shortest available delay. The controller (32 in FIG. 3) is configured to perform this operation. Said queue may be provided only for data packets and frames being classified in said channel access priority class providing none or shortest available delay and to be transmitted according to one single transmission rate set by the predetermined synchronization packet transmission rule. In one embodiment of the method, said queue is only provided for synchronization packets.

S122c: Modulate the frame encapsulating the synchronization packet, frame by frame, according to the predetermined synchronization packet transmission rule prescribing transmission of the synchronization packets with the same transmission rate over the transport link between two Access Points. Said step which results in modulation with modulation and coding standard, i.e. transmission rate offering high immunity for the synchronization packets.

The process results in that the synchronization packet encapsulated in a data link layer frame, e.g. a IEEE802.11e defined frame, will be marked with highest available channel access priority class, i.e. TCI or TCID value, such that it will be transmitted by the WIFI transmitter (48 in FIG. 3) in the WIFI transceiver (20 in FIG. 3) without none or less delay and that it will be modulated and coded by the adaptive modulator (60 in FIG. 3) according to a low modulation and coding standard, transmission rate, available in the WIFI transceiver.

The method and embodiments thereof may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The method and embodiments thereof may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

As already stated, one advantage is that WiFi becomes more reliable for distribution of packet based synchronization over the air interface regardless of synchronization implementation, e.g. time stamping of the synchronization packet in the WiFi node, and synchronization of transparent, boundary or pass-through clocks.

A number of embodiments have been described. It will be understood that various modifications may be made without departing from the scope of the invention. Therefore, other implementations are within the scope of the following claims defining the invention.

TABLE 2

The relationships between the variables that allow for the maximum data rate for the Modulation and Coding Schemes. (GI = Guard Interval)

| MCS index | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 0 | 1 | BPSK | 1/2 | 6.50 | 7.20 | 13.50 | 15.00 |
| 1 | 1 | QPSK | 1/2 | 13.00 | 14.40 | 27.00 | 30.00 |
| 2 | 1 | QPSK | 3/4 | 19.50 | 21.70 | 40.50 | 45.00 |
| 3 | 1 | 16-QAM | 1/2 | 26.00 | 28.90 | 54.00 | 60.00 |
| 4 | 1 | 16-QAM | 3/4 | 39.00 | 43.30 | 81.00 | 90.00 |
| 5 | 1 | 64-QAM | 2/3 | 52.00 | 57.80 | 108.00 | 120.00 |
| 6 | 1 | 64-QAM | 3/4 | 58.50 | 65.00 | 121.50 | 135.00 |
| 7 | 1 | 64-QAM | 5/6 | 65.00 | 72.20 | 135.00 | 150.00 |
| 8 | 2 | BPSK | 1/2 | 13.00 | 14.40 | 27.00 | 30.00 |
| 9 | 2 | QPSK | 1/2 | 26.00 | 28.90 | 54.00 | 60.00 |
| 10 | 2 | QPSK | 3/4 | 39.00 | 43.30 | 81.00 | 90.00 |
| 11 | 2 | 16-QAM | 1/2 | 52.00 | 57.80 | 108.00 | 120.00 |
| 12 | 2 | 16-QAM | 3/4 | 78.00 | 86.70 | 162.00 | 180.00 |
| 13 | 2 | 64-QAM | 2/3 | 104.00 | 115.60 | 216.00 | 240.00 |
| 14 | 2 | 64-QAM | 3/4 | 117.00 | 130.00 | 243.00 | 270.00 |
| 15 | 2 | 64-QAM | 5/6 | 130.00 | 144.40 | 270.00 | 300.00 |
| 16 | 3 | BPSK | 1/2 | 19.50 | 21.70 | 40.50 | 45.00 |
| 17 | 3 | QPSK | 1/2 | 39.00 | 43.30 | 81.00 | 90.00 |
| 18 | 3 | QPSK | 3/4 | 58.50 | 65.00 | 121.50 | 135.00 |
| 19 | 3 | 16-QAM | 1/2 | 78.00 | 86.70 | 162.00 | 180.00 |

TABLE 2-continued

The relationships between the variables that allow for the maximum data rate for the Modulation and Coding Schemes. (GI = Guard Interval)

| MCS index | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 20 | 3 | 16-QAM | 3/4 | 117.00 | 130.00 | 243.00 | 270.00 |
| 21 | 3 | 64-QAM | 2/3 | 156.00 | 173.30 | 324.00 | 360.00 |
| 22 | 3 | 64-QAM | 3/4 | 175.50 | 195.00 | 364.50 | 405.00 |
| 23 | 3 | 64-QAM | 5/6 | 195.00 | 216.70 | 405.00 | 450.00 |
| 24 | 4 | BPSK | 1/2 | 26.00 | 28.80 | 54.00 | 60.00 |
| 25 | 4 | QPSK | 1/2 | 52.00 | 57.60 | 108.00 | 120.00 |
| 26 | 4 | QPSK | 3/4 | 78.00 | 86.80 | 162.00 | 180.00 |
| 27 | 4 | 16-QAM | 1/2 | 104.00 | 115.60 | 216.00 | 240.00 |
| 28 | 4 | 16-QAM | 3/4 | 156.00 | 173.20 | 324.00 | 360.00 |
| 29 | 4 | 64-QAM | 2/3 | 208.00 | 231.20 | 432.00 | 480.00 |
| 30 | 4 | 64-QAM | 3/4 | 234.00 | 260.00 | 486.00 | 540.00 |
| 31 | 4 | 64-QAM | 5/6 | 260.00 | 288.80 | 540.00 | 600.00 |

The invention claimed is:

1. A method for ensuring proper and correct packet based synchronization of different nodes in the link layer of data communications systems and networks using Wireless Fidelity (WIFI) technology as a bearer in a transport link interface and distributing synchronization packets from a first Access Point over a WIFI transport link interface to a second Access Point, wherein the first Access Point provides dynamic transmission rate adaptation for the transport link interface using different coding and modulation schemes by performing the method comprising:
receiving a plurality of packets from at least the second Access Point;
identifying one or more of the received packets as a synchronization packet for synchronizing the first and second Access Points;
setting the transmission rate for the one or more identified synchronization packets according to a predetermined transmission rule for transmitting synchronization packets over the WIFI transport link; and
transmitting the one or more identified synchronization packets to the second Access Point over the WIFI transport link interface according to the set transmission rate.

2. The method according to claim 1, wherein the predetermined synchronization packet transmission rule comprises transmission of the synchronization packets with the same transmission rate in both directions over the transport link between the first and second Access Points.

3. The method according to claim 1, wherein the predetermined synchronization packet transmission rule comprises transmission of the synchronization packets with the transmission rate offering low transmission capacity and/or bandwidth of the available transmission rates.

4. The method according to claim 1, wherein the predetermined synchronization packet transmission rule comprises transmission of the synchronization packets with the available transmission rate offering high immunity for the synchronization packets.

5. The method according to claim 1, wherein the predetermined synchronization packet transmission rule comprises transmission of the synchronization packets according to the same channel access priority in both directions over the transport link between the first and second Access Points, said channel access priority being defined by transmission with none or shortest available delay.

6. The method according to claim 1, wherein setting the transmission rate comprises:
classifying the synchronization packet to a channel access priority class being defined by none or shortest available delay.

7. The method according to claim 6, wherein setting the transmission rate further comprises:
directing and forwarding each synchronization packet to a queue for data packets and frames being classified in said channel access priority class providing none or shortest available delay.

8. The method according to claim 7, wherein said queue is only provided for data packets and frames being classified in said channel access priority class providing none or shortest available delay and to be transmitted according to one single transmission rate set by the predetermined synchronization packet transmission rule.

9. The method according to claim 7, wherein said queue is only provided for synchronization packets.

10. The method according to claim 1, wherein the transmitting of each synchronization packet comprises:
transmitting each synchronization packet using multiple input-multiple output (MIMO) technology or variants of the MIMO technology.

11. The method according to claim 10, wherein transmitting each synchronization packet comprises:
transmitting each synchronization packet simultaneous and in parallel over more than one channel of said transport link.

12. The method according to claim 11, wherein transmitting each synchronization packet simultaneous and in parallel over more than one channel of said transport link comprises the use of coherent or differential space-time block codes or other similar techniques across multiple antennas.

13. The method according to claim 1, wherein at least one of the first and second Access Points comprises a Radio Base Station in a telecommunications system and network.

14. The method according to claim 1, wherein synchronization packets are used for clock synchronization of the first Access Point and the second Access Point, and wherein the first Access Point and the second Access Point are different types of radio base stations.

15. An access point node configured to ensure proper and correct packet based synchronization of different nodes in the link layer of data communications systems and networks using Wireless Fidelity (WIFI) technology as a bearer in a transport link interface and distribute synchronization packets from the access point node over a WIFI transport link interface to a second access point node, wherein the access point node provides dynamic transmission rate adaptation using different coding and modulation schemes, wherein the access point node comprises:
a transceiver configured to receive a plurality of packets from at least the second Access Point;
processing circuitry configured to:
identify one or more of the received packets as a synchronization packet for synchronizing the access point node and the second access point node; and
set the transmission rate for the one or more identified synchronization packets according to a predetermined transmission rule for transmitting synchronization packets over the WIFI transport link; and
the transceiver further configured to transmit the one or more identified synchronization packets to the second access point node over the WIFI transport link interface according to the set transmission rate.

16. The access point node according to claim 15, wherein the predetermined synchronization packet transmission rule comprises transmission of the synchronization packets with the same transmission rate in both directions over the transport link between the access point node and the second access point node.

17. The access point node according to claim 15, wherein the predetermined synchronization packet transmission rule comprises transmission of the synchronization packets with a transmission rate offering low transmission capacity and/or bandwidth of the available transmission rates.

18. The access point node according to claim 15, wherein the predetermined synchronization packet transmission rule comprises transmission of the synchronization packets with the available transmission rate offering high immunity for the synchronization packets.

19. The access point node according to claim 15, wherein the predetermined synchronization packet transmission rule comprises transmission of the synchronization packets according to the same channel access priority in both directions over the transport link between the access point node and the second access point node, said channel access priority being defined by transmission with none or shortest available delay.

20. The access point node according to claim 15, wherein the processing circuitry is further configured to set the transmission rate for an adaptive coding and modulator, and further comprising a classifier, configured to classify each synchronization packet to a channel access priority class being defined by none or shortest available delay.

21. The access point node according to claim 20, wherein the processing circuitry is further configured to direct and forward each synchronization packet to a buffer queue for data packets and frames being classified in said channel access priority class providing none or shortest available delay.

22. The access point node according to claim 21, wherein said buffer queue is only provided for data packets and frames being classified in said channel access priority class providing none or shortest available delay and to be transmitted according to one single transmission rate set by the predetermined synchronization packet transmission rule.

23. The access point node according to claim 21, wherein said buffer queue is only provided for synchronization packets.

24. The access point node according to claim 15, wherein the transceiver is further configured to transmit each synchronization packet by means of multiple input-multiple output (MIMO) technology or variants of the MIMO technology.

25. The access point node according to claim 24, wherein the transceiver is further configured to transmit each synchronization packet simultaneous and in parallel over more than one channel of said transport link.

26. The access point node according to claim 25, wherein transmitting each synchronization packet simultaneous and in parallel over more than one channel of said transport link comprises the use of coherent or differential space-time block codes or other similar techniques across multiple antennas.

27. The access point node according to claim 15, wherein at least one of the access point node or the second access point node comprises a radio base station in a telecommunications system and network.

28. The access point node according to claim 15, wherein synchronization packets are used for clock synchronization of the access point node and the second access point node, and wherein the access point node and the second access point node are different types of radio base stations.

* * * * *